UNITED STATES PATENT OFFICE.

ALBERT SCHMIDT-PREDARI, OF WEIMAR, GERMANY.

ELECTRIC ACCUMULATOR.

SPECIFICATION forming part of Letters Patent No. 724,619, dated April 7, 1903.

Application filed July 24, 1902. Serial No. 116,876. (No model.)

*To all whom it may concern:*

Be it known that I, ALBERT SCHMIDT-PREDARI, engineer, a subject of the German Emperor, and a resident of Weimar, in the Grand Duchy of Saxony, German Empire, have invented new and useful Improvements in Electric Accumulators, of which the following is a full, clear, and exact specification.

The object of my invention is an accumulator of higher capacity and having a longer life than those of like size and weight at present on the market and in which, moreover, the electrolyte is less liable to segregation, the efficiency is greater and the cost of producing the plates is less.

My invention consists in providing special active masses for both the negative-pole electrodes and the positive-pole electrodes. The electrodes thus obtained may be formed and used with the usual electrolytes; but I prefer to form the electrodes and to use the formed electrodes with special electrolytes likewise forming parts of my invention.

The active mass I use for the negative-pole electrodes is composed of a mixture of lead oxid, red lead, calcium hydroxid, and alkali thiosulfate. These additions are made for the purpose of preventing the active mass from being hardened when brought into the formation electrolyte. Consequently the electrodes can sustain the action of the current without bursting or undergoing a deformation and the capacity is increased. In carrying out my invention I have found, for instance, the following proportions to give good results, the parts being by weight: Two parts of lead oxid, one part of red lead, one-twentieth part of calcium hydroxid, and one-twentieth part of sodium thiosulfate.

The active mass I use for the positive-pole electrodes is composed of a mixture of lead oxid, red lead, and porous spongy lead. The addition of spongy lead is made for the purpose of giving the mass a certain tenacity and cohesion and of preventing it from being hardened when brought into the formation electrolyte. In this way also the positive-pole electrodes are prevented from being deformed during the formation. In carrying out my invention I have found, for instance, the following proportions to give good results, the parts being by weight: One part of lead oxid, two parts of red lead, and about one-twentieth part of spongy lead. The spongy lead referred to is preferably prepared galvanically by immersing several plates of lead in a solution of alkali thiosulfate, preferably a solution of sodium thiosulfate of, for instance, from one and seven-hundredths (1.07) to one and twelve-hundredths (1.12) specific gravity, and passing an electric current. This method has the advantage that the spongy lead is not deposited on the plates, but is precipitated in the liquid and collects on the bottom of the vessel.

The active masses obtained, as above set forth, are stirred up with a suitable binding material to a magma which can be kneaded and then applied to the plates in the usual manner. Dilute sulfuric acid of about one and twelve-hundredths (1.12) specific gravity is specially advantageous as a binding material. The plates, which differ in form according to the purpose for which the accumulator is destined, are cast from lead in the usual manner. Before the active mass is applied to them they are immersed in a solution of salt—for instance, of about one and four-hundredths (1.04) specific gravity—to purify them from fatty matter. The plates made in this manner may be formed in the usual way; but, as above mentioned, I prefer to form them in a solution of Glauber salt, which is heated before use, care being taken that no evaporation of water occurs, and is poured into the vessel while warm. I have found a suitable concentration of the solution to be, for instance, that at a specific gravity of one and nine-hundredths, (1.09.) The temperature of the liquid when poured into the vessels is preferably of from 25° to 30° centigrade and decreases down to the surrounding temperature during the formation, which requires from two to three hours. The formed plates may be used with the usual electrolytes; but the electrolyte best fitted for use with them is sulfuric acid to which an alkali thiosulfate has been added. Sulfuric acid of one and fourteen-hundredths (1.14) specific gravity with an addition of sodium-thiosulfate solution of one and four-hundredths (1.04) specific gravity has been found to be suitable, the proportions being, preferably, two volumes of sulfuric acid and from one-half to one volume of sodium-thiosulfate solution. This liquid, which is at first turbid, becomes clear when the accumulator is first charged and then remains clear.

The loss by evaporation during the use of the accumulator need be made good only with water.

It is to be understood that I do not limit myself to the figures indicated above, which may be varied within rather large limits without departing from the scope of my invention.

Now what I claim is—

1. An electric accumulator, consisting of lead plates, a magma applied to the negative-pole electrode and composed of a mixture of lead oxid, red lead, calcium hydroxid, alkali thiosulfate and a suitable binding material, a magma for the positive-pole electrode, composed of a mixture of lead oxid, red lead, porous spongy lead and a suitable binding material, and a suitable electrolyte in which said plates are immersed after formation, substantially as set forth.

2. An electric accumulator, consisting of lead plates, a magma applied to the negative-pole electrode and composed of a mixture of lead oxid, red lead, calcium hydroxid, alkali thiosulfate and a suitable binding material, a magma for the positive-pole electrode, composed of a mixture of lead oxid, red lead, porous spongy lead and a suitable binding material, and an electrolyte composed of a mixture of sulfuric acid and alkali thiosulfate in which the plates are immersed after formation, substantially as set forth.

3. An electric accumulator-plate, consisting of a lead plate and a magma for the negative-pole electrode, composed of a mixture of lead oxid, red lead, calcium hydroxid, alkali thiosulfate and a suitable binding material, substantially as set forth.

In testimony that I claim the foregoing as my invention I have signed my name in presence of two subscribing witnesses.

ALBERT SCHMIDT-PREDARI.

Witnesses:
WOLDEMAR HAUPT,
HENRY HASPER.